(12) United States Patent
Kim et al.

(10) Patent No.: US 12,253,705 B2
(45) Date of Patent: Mar. 18, 2025

(54) POLARIZING PLATE AND OPTICAL DISPLAY APPARATUS COMPRISING THE SAME

(71) Applicant: Samsung SDI Co., Ltd., Yongin-si (KR)

(72) Inventors: Bong Choon Kim, Suwon-si (KR); Jun Mo Koo, Suwon-si (KR); Dong Yoon Shin, Suwon-si (KR); Jung Hun You, Suwon-si (KR); Sang Hum Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 230 days.

(21) Appl. No.: 17/381,550

(22) Filed: Jul. 21, 2021

(65) Prior Publication Data

US 2022/0026614 A1    Jan. 27, 2022

(30) Foreign Application Priority Data

Jul. 23, 2020   (KR) .................... 10-2020-0091948

(51) Int. Cl.
*G02B 5/30*     (2006.01)
*G02B 1/04*     (2006.01)
*G02F 1/13363*  (2006.01)

(52) U.S. Cl.
CPC ............ *G02B 5/3083* (2013.01); *G02B 1/04* (2013.01); *G02B 5/305* (2013.01); *G02F 1/13363* (2013.01); *C09K 2323/00* (2020.08); *C09K 2323/03* (2020.08); *C09K 2323/031* (2020.08)

(58) Field of Classification Search
CPC ............ C09K 2323/00; C09K 2323/03; C09K 2323/031; G02B 5/305; G02B 5/3083; G02B 1/04; G02F 1/13363
USPC ......................................... 428/1.1, 1.3, 1.31
See application file for complete search history.

(56) References Cited

U.S. PATENT DOCUMENTS

2016/0025913 A1\*  1/2016  Oh .................. G02B 5/3083
                                                     359/487.02
2018/0095211 A1\*  4/2018  Lee ................. G02F 1/133634

FOREIGN PATENT DOCUMENTS

| CN | 108292003 A | \* | 7/2018 | ............... G02B 5/30 |
| KR | 10-2013-0103595 A | | 9/2013 | |
| KR | 10-2016-0012274 A | | 2/2016 | |
| KR | 10-2018-0088402 A | | 8/2018 | |

OTHER PUBLICATIONS

Korean Office Action dated Jul. 20, 2023, issued in corresponding Korean Patent Application No. 10-2020-0091948 (5 pages).

\* cited by examiner

*Primary Examiner* — Ruiyun Zhang
(74) *Attorney, Agent, or Firm* — Womble Bond Dickinson (US) LLP (57) ABSTRACT

A polarizing plate and an optical display apparatus including the same are provided. A polarizing plate includes a polarizer; and a first retardation layer and a second retardation layer sequentially stacked on a lower surface of the polarizer, and the first retardation layer has an in-plane retardation of about 180 nm to about 220 nm at a wavelength of about 550 nm; and the second retardation layer has an in-plane retardation of about 80 nm to about 100 nm at a wavelength of about 550 nm.

17 Claims, 1 Drawing Sheet

POLARIZING PLATE AND OPTICAL DISPLAY APPARATUS COMPRISING THE SAME

CROSS-REFERENCE TO RELATED APPLICATION

This application claims priority to and the benefit of Korean Patent Application No. 10-2020-0091948, filed on Jul. 23, 2020 in the Korean Intellectual Property Office, the entire disclosure of which is incorporated herein by reference.

BACKGROUND

1. Field

Aspects of embodiments of the present invention relate to a polarizing plate and an optical display apparatus including the same.

2. Description of the Related Art

An organic light emitting diode display can suffer from deterioration in visibility and contrast due to reflection of external light. To solve this problem, a polarizing plate including a polarizer and a retardation film is used to realize an antireflection function by preventing leakage of reflected external light.

The retardation film may include a ¼ retardation layer alone or may be a laminate of a ½ retardation layer and a ¼ retardation layer. However, a polarizing plate including the ¼ retardation layer alone or the laminate of the ½ retardation layer and the ¼ retardation layer has a limitation in achievement of an ellipticity of about 65% or more at an incidence angle of about 60°. Moreover, with recent tendency of reduction in thickness of the polarizing plate, there is a need for reduction in thickness of not only the polarizer but also the retardation layer.

The background technique of the present invention is disclosed in KR Patent Laid-open Publication No. 10-2013-0103595 and the like.

SUMMARY

According to aspects of embodiments of the present invention, a polarizing plate that has low reflectivity at both a front side and a lateral side of a screen and an ellipticity of about 65% or more at an incidence angle of about 60° and allows reduction in thickness thereof, and an optical display apparatus including the same ae provided.

According to an aspect of embodiments of the present invention, a polarizing plate that has low reflectivity at both a front side and a lateral side of a screen is provided.

According to another aspect of embodiments of the present invention, a polarizing plate that has an ellipticity of about 65% or more at an incidence angle of about 60° is provided.

According to another aspect of embodiments of the present invention, a polarizing plate that allows effective reduction in thickness of a retardation layer is provided.

One aspect of the present invention relates to a polarizing plate.

According to one or more embodiments of the present invention, a polarizing plate includes: a polarizer; and a first retardation layer and a second retardation layer sequentially stacked on a lower surface of the polarizer, wherein the first retardation layer has an in-plane retardation of about 180 nm to about 220 nm at a wavelength of about 550 nm; and the second retardation layer has an in-plane retardation of about 80 nm to about 100 nm at a wavelength of about 550 nm.

The first retardation layer may be a ½ retardation layer at a wavelength of about 550 nm, and the second retardation layer may be a ¼ retardation layer at a wavelength of about 550 nm.

The first retardation layer may have a slow axis tilted at an angle of about +55° to about +80° or at an angle of about −80° to about −55° with reference to a transmission axis of the polarizer.

The second retardation layer may have a slow axis tilted at an angle of about 0° to about +10° or at an angle of about −10° to about 0° with reference to a transmission axis of the polarizer.

The first retardation layer and the second retardation layer may satisfy at least one of ① to ⑧ in Relation 1:

① when 0°<θ[fast axis of first retardation layer–absorption axis]<90°, θ[fast axis of second retardation layer–absorption axis]=θ[fast axis of first retardation layer–absorption axis]×2+45+α, 4°≤α≤6°;

② when −90°<θ[slow axis of first retardation layer–absorption axis]<0°, θ[slow axis of second retardation layer–absorption axis]=θ[slow axis of first retardation layer–absorption axis]×2−45+α, 4°≤α≤6°;

③ when −90°<θ[fast axis of first retardation layer–absorption axis]<0°, θ[fast axis of second retardation layer–absorption axis]=θ[fast axis of first retardation layer–absorption axis]×2−45−α, 4°≤α≤6°;

④ when 0°<θ[slow axis of first retardation layer–absorption axis]<90°, θ[slow axis of second retardation layer–absorption axis]=θ[slow axis of first retardation layer–absorption axis]×2−45−α, 4°≤α≤6°, (in ①, ②, ③, and ④, θ[fast axis of first retardation layer–absorption axis] is an angle (unit: °) of the fast axis of the first retardation layer with reference to the absorption axis of the polarizer, θ[slow axis of first retardation layer–absorption axis] is an angle (unit: °) of the slow axis of the first retardation layer with reference to the absorption axis of the polarizer, θ[fast axis of second retardation layer–absorption axis] is an angle (unit: °) of the fast axis of the second retardation layer with reference to the absorption axis of the polarizer, and θ[slow axis of second retardation layer–absorption axis] is an angle (unit: °) of the slow axis of the second retardation layer with reference to the absorption axis of the polarizer);

⑤ when 0°<θ[slow axis of first retardation layer–transmission axis]<90°, θ[slow axis of second retardation layer–transmission axis]=θ[slow axis of first retardation layer–transmission axis]×2+45+α, 4°≤α≤6°;

⑥ when −90°<θ[fast axis of first retardation layer–transmission axis]<0°, θ[fast axis of second retardation layer–transmission axis]=θ[fast axis of first retardation layer–transmission axis]×2−45+α, 4°≤α≤6°;

⑦ when −90°<θ[slow axis of first retardation layer–transmission axis]<0°, θ[slow axis of second retardation layer–transmission axis]=θ[slow axis of first retardation layer–transmission axis]×2−45−α, 4°≤α≤6°; and ⑧ when 0°<θ[fast axis of first retardation layer–transmission axis]<90°, θ[fast axis of second retardation layer–transmission axis]=θ[fast axis of first retardation layer–transmission axis]×2−45−α, 4°≤α≤6°, (in ⑤, ⑥, ⑦, and ⑧, θ[fast axis of first retardation layer–transmission axis] is an angle (unit: °) of the fast axis of the first retardation layer with reference to the transmission axis of the polarizer, θ[slow axis of first retardation layer–transmission axis] is an angle (unit: °) of the slow axis of the first retardation layer with reference to the transmission axis of the polarizer, θ[fast axis of second retardation layer–transmission axis] is an angle (unit: °) of the fast axis of the second retardation layer with reference to the transmission axis of the polarizer, and θ[slow axis of second retardation layer–transmission axis] is an angle (unit: °) of the slow axis of the second retardation layer with reference to the transmission axis of the polarizer).

An angle defined between a slow axis of the first retardation layer and a slow axis of the second retardation layer may be in a range from about 55° to about 80°.

The first retardation layer may exhibit positive dispersion or flat dispersion, and the second retardation layer may exhibit positive dispersion.

A laminate of the first retardation layer and the second retardation layer may have an in-plane retardation of about 140 nm to about 190 nm at a wavelength of about 550 nm.

The first retardation layer may have an out-of-plane retardation (Rth) of about 100 nm to about 150 nm at a wavelength of about 550 nm.

The first retardation layer may have a degree of biaxiality (NZ) of about 1.1 to about 1.2 at a wavelength of about 550 nm.

The second retardation layer may have an out-of-plane retardation (Rth) of about −100 nm to about −50 nm at a wavelength of about 550 nm.

The second retardation layer may have a degree of biaxiality (NZ) of about −0.5 to about −0.2 at a wavelength of about 550 nm.

The first retardation layer may include a film formed of a resin having positive (+) birefringence.

The second retardation layer may include a coating layer formed by stretching a film formed of at least one selected from among a cellulose ester resin and an aromatic resin.

The polarizing plate may further include a third retardation layer including a positive C plate having an out-of-plane retardation (Rth) of about −300 nm to about 0 nm at a wavelength of about 550 nm.

The third retardation layer may have an out-of-plane retardation (Rth) of about −80 nm to about −20 nm at a wavelength of about 550 nm.

The third retardation layer may be interposed between the polarizer and the first retardation layer.

The polarizing plate may further include a protective layer formed on an upper surface of the polarizer.

Another aspect of the present invention relates to an optical display apparatus.

According to one or more embodiments of the present invention, an optical display apparatus includes the polarizing plate according to an embodiment of the present invention.

According to an aspect of embodiments of the present invention, a polarizing plate has low reflectivity at both a front side and a lateral side.

According to another aspect of embodiments of the present invention, a polarizing plate has an ellipticity of about 65% or more at an incidence angle of about 60°.

According to another aspect of embodiments of the present invention, a polarizing plate allows effective reduction in thickness of a retardation layer.

DETAILED DESCRIPTION

Herein, some embodiments of the present invention will be described in further detail with reference to the accompanying drawings to provide a thorough understanding of the invention to those skilled in the art. However, it is to be understood that the present invention may be embodied in different ways and is not limited to the following embodiments.

In the drawings, components unrelated to the description may be omitted for clear description of the invention, and like components are denoted by like reference numerals throughout the specification. Although lengths, thicknesses, or widths of various components may be exaggerated for understanding in the drawings, the present invention is not limited thereto.

Herein, spatially relative terms, such as "upper" and "lower," are defined with reference to the accompanying drawings. Thus, it will be understood that the term "upper surface" can be used interchangeably with the term "lower surface."

Herein, "in-plane retardation (Re)," "out-of-plane retardation (Rth)," and "degree of biaxiality (NZ)" are represented by the following Equations A, B, and C, respectively:

$$Re = (nx - ny) \times d,  \quad \text{Equation A:}$$

$$Rth = ((nx + ny)/2 - nz) \times d, \quad \text{Equation B:}$$

$$NZ = (nx - nz)/(nx - ny), \quad \text{Equation C:}$$

where nx, ny, and nz are indexes of refraction of an optical device in the slow axis direction, the fast axis direction, and the thickness direction of the optical device at a measurement wavelength, respectively, and d is the thickness of the optical device (unit: nm). In Equations A to C, the measurement wavelength may be about 450 nm, about 550 nm, or about 650 nm.

Herein, "short wavelength dispersion" refers to Re(450)/Re(550) and "long wavelength dispersion" refers to Re(650)/Re(550), wherein Re(450), Re(550), and Re(650) refer to in-plane retardation (Re) of a single retardation layer or a laminate of retardation layers at wavelengths of about 450 nm, about 550 nm, and about 650 nm, respectively.

As used herein to represent an angle, "+" means a counterclockwise direction about a reference, and "−" means a clockwise direction about the reference, assuming the reference (for example, a transmission axis of a polarizer) is 0°.

As used herein to represent a specific numerical range, the expression "X to Y" means "greater than or equal to X and less than or equal to Y (X≤ and ≤Y)".

A polarizing plate according to one or more embodiments of the present invention achieves thickness reduction through reduction in total thickness of a first retardation layer and a second retardation layer and realizes low reflectivity at both a front side and a lateral side and an ellipticity of about 65% or more at an incidence angle of about 60°, thereby enabling remarkable improvement in screen quality upon application to an optical display apparatus.

In an embodiment, the polarizing plate may have a specular component excluded (SCE) reflectivity of about 1.5% or less, and, in an embodiment, about 0% to about 1.4%, at a front side of a screen, and an SCE reflectivity of about 3% or less, and, in an embodiment, about 0% to about 2.8%, at an incidence angle of about 60° upon application to an optical display apparatus. Within this range, the polarizing plate can improve screen quality.

In an embodiment, the polarizing plate may have an ellipticity of about 65% or more, for example, about 65% to about 80% or about 75% to about 80%, at an incidence angle of about 60° upon application to an optical display apparatus. Within this range, the polarizing plate can improve screen quality (minimizing or reducing color variation at an incidence angle of about 60° and at an azimuth angle of about 0° to about 360°).

Next, a polarizing plate according to an embodiment of the present invention will be described with reference to FIG. 1.

Figure 1:
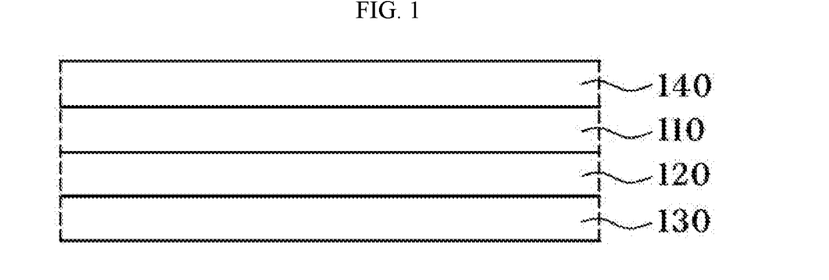
FIG. 1 is a cross-sectional view of a polarizing plate according to an embodiment of the present invention.

Referring to FIG. 1, according to an embodiment, a polarizing plate includes a polarizer 110, a protective film 140 stacked on an upper surface of the polarizer 110, and a first retardation layer 120 and a second retardation layer 130 sequentially stacked on a lower surface of the polarizer 110 in the stated order. The protective film 140 is an example of a protective layer including a protective coating layer and the like.

In the polarizing plate, the first retardation layer 120 and the second retardation layer 130 are sequentially stacked on a lower surface of the polarizer 110. With this structure, the polarizing plate can achieve reduction in reflectivity and an ellipticity of about 65% or more at the front side and at an incidence angle of about 60°. A polarizing plate including the second retardation layer 130 and the first retardation layer 120 sequentially stacked on the lower surface of the polarizer 110 cannot achieve the effects of the present invention.

In an embodiment, the second retardation layer 130 may be directly formed on the first retardation layer 120. Herein, "directly formed" means that neither an adhesive layer nor a bonding layer is interposed between the first retardation layer and the second retardation layer. In other embodiments, the second retardation layer may be formed by a transfer process and stacked on the first retardation layer via a pressure sensitive adhesive (PSA) or the like.

In an embodiment, a certain optical layer may be further interposed between the first retardation layer 120 and the second retardation layer 130 so long as the other optical layer does not affect an effect realized by each of the first retardation layer 120 and the second retardation layer 130 or an effect realized by combination of the first retardation layer 120 and the second retardation layer 130.

First Retardation Layer

In an embodiment, the first retardation layer 120 may have an in-plane retardation of about 180 nm to about 220 nm (for example, 180 nm, 190 nm, 200 nm, 210 nm, or 220 nm) at a wavelength of about 550 nm. As a result, the first retardation layer 120 can realize remarkable reduction in reflectivity at both a front side and a lateral side of a screen and an ellipticity of about 65% or more at an incidence angle of about 60° when combined with the second retardation layer 130 having an in-plane retardation of about 80 nm to about 100 nm (for example, 80 nm, 90 nm, or 100 nm) at a wavelength of about 550 nm. In an embodiment, the first retardation layer 120 has an in-plane retardation of about 200 nm to 210 nm at a wavelength of about 550 nm. In an embodiment, the first retardation layer may be a ⅓ retardation layer at a wavelength of about 550 nm.

In an embodiment, the first retardation layer 120 may exhibit positive dispersion or flat dispersion (short wavelength dispersion: 1, long wavelength dispersion: 1), particularly a short wavelength dispersion of about 1 to about 1.1 and a long wavelength dispersion of about 0.96 to about 1. Within this range, the polarizing plate can reduce reflectivity at both a front side and a lateral side while improving ellipticity. In an embodiment, the first retardation layer 120 exhibits a short wavelength dispersion of about 1 to about 1.06 and a long wavelength dispersion of about 0.98 to about 1, about 0.99 to about 1, or about 0.995 to about 1.

In an embodiment, the first retardation layer 120 may have an out-of-plane retardation (Rth) of about 100 nm to about 150 nm (for example, 100 nm, 110 nm, 120 nm, 130 nm, 140 nm, or 150 nm), and, in an embodiment, about 105 nm to about 140 nm, at a wavelength of about 550 nm. Within this range, the first retardation layer 120 can improve lateral reflectivity.

In an embodiment, the first retardation layer 120 may have a degree of biaxiality of about 1.1 to about 1.2 (for example, 1.1, 1.11, 1.12, 1.13, 1.14, 1.15, 1.16, 1.17, 1.18, 1.19, or 1.2), and, in an embodiment, about 1.1 to about 1.15, at a wavelength of about 550 nm. Within this range, the first retardation layer can improve lateral reflectivity.

In an embodiment, the first retardation layer 120 may be a non-liquid crystal layer and may include a film formed of an optically transparent resin. The "non-liquid crystal layer" may mean a layer which is not formed of at least one selected from among a liquid crystal monomer, a liquid crystal oligomer, and a liquid crystal polymer, or a layer formed of a material not converted into a liquid crystal monomer, a liquid crystal oligomer, or a liquid crystal polymer through irradiation with light.

For example, the first retardation layer 120 may be formed of at least one resin selected from among cellulose resins including triacetylcellulose (TAC) and the like, polyester resins including polyethylene terephthalate, polybutylene terephthalate, polyethylene naphthalate (PEN), polybutylene naphthalate, and the like, cyclic polyolefin (COP) resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. In an embodiment, the first retardation layer 120 includes a cyclic polyolefin film to secure short wavelength dispersion and long wavelength dispersion. In a polarizing plate according to the present invention, the cyclic polyolefin (COP) film can effectively improve front reflectivity.

In an embodiment, the first retardation layer 120 may include a film formed of a resin having positive (+) birefringence.

In an embodiment, the first retardation layer 120 may have a thickness of 60 μm or less, and, in an embodiment, about 10 μm to about 60 μm, and, in an embodiment, about 20 μm to about 50 μm. Within this range, the first retardation layer 120 can be used in the polarizing plate.

The first retardation layer 120 may be formed by stretching a non-stretched film formed of the optically transparent resin and may be stacked on a polarizer to fabricate the polarizing plate through a roll-to-roll process, thereby improving processability.

In an embodiment, the first retardation layer 120 is formed by obliquely stretching a film at an angle (e.g., a predetermined angle) with reference to a machine direction of the film in a non-stretched state and can secure a slow axis tilted with respect to the machine direction of the film. A method for obliquely stretching the film may be performed by a typical method known to those skilled in the art.

For the first retardation layer 120 formed of the obliquely stretched film, the slow axis of the first retardation layer 120 may be tilted at an angle (e.g., a predetermined angle) with reference to the transmission axis of the polarizer 110, whereby the polarizing plate can reduce reflectivity at both a front side and a lateral side of a screen while improving ellipticity at the lateral side. The transmission axis of the polarizer 110 corresponds to a transverse direction (TD) of the polarizer 110.

Figure 2:
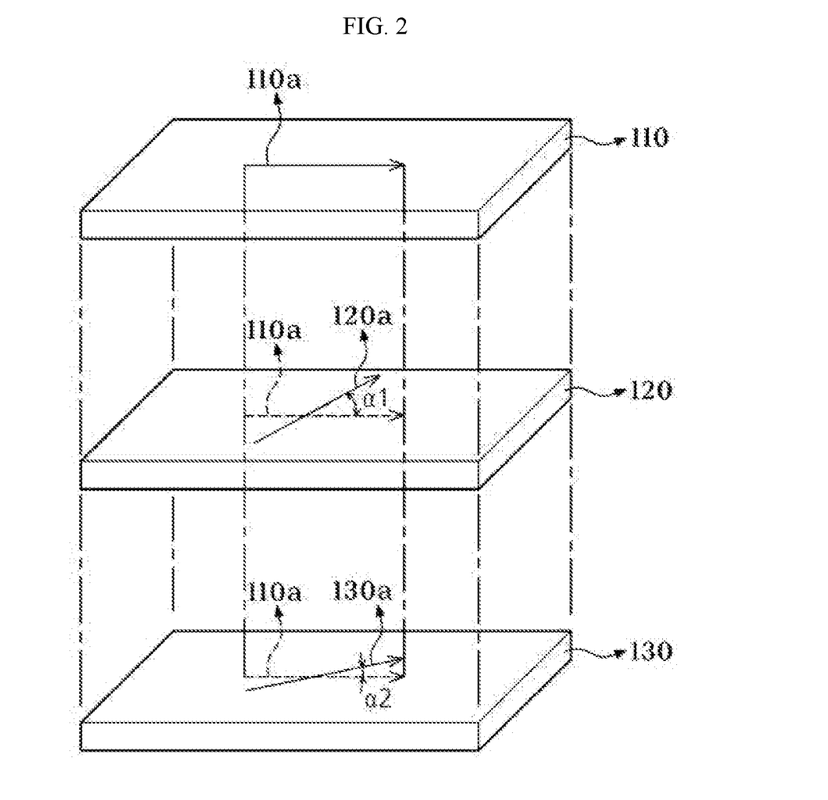
FIG. 2 is a view illustrating arrangement relations between a transmission axis of a polarizer, a slow axis of a first retardation layer, and a slow axis of a second retardation layer in a polarizing plate according to an embodiment of the present invention.

Referring to FIG. 2, a slow axis 120a of the first retardation layer 120 is tilted at an angle α1 of about +55° to about +80° (for example, +55°, +60°, +65°, +70°, +75°, or +80°) or at an angle α1 of about −80° to about −55° (for example, −80°, −75°, −70°, −65°, −60°, or −55°) with reference to a transmission axis 110a of the polarizer 110. Within this range, an angle defined between the slow axis 120a of the first retardation layer 120 and a slow axis 130a of the second retardation layer 130 can be within a certain range (e.g., a preset range), whereby the polarizing plate can reduce front and lateral reflectivity while securing an ellipticity of about 65% or more at an incidence angle of about 60°. In an embodiment, the angle α1 is in a range of about +62° to about +75° or in a range of about −75° to about −62°, and, in an embodiment, in a range of about +64° to about +70° or in a range of about −70° to about −64°.

In an embodiment, although not shown in FIG. 1, the first retardation layer 120 may be bonded to the polarizer 110 via a first bonding layer. The first bonding layer may be formed of, for example, a water-based bonding agent and/or a photo-curable bonding agent. In an embodiment, the first bonding layer is formed of a photo-curable bonding agent, whereby bonding between the protective film 140 and the polarizer 110 and bonding between the polarizer 110 and the first retardation layer 120 can be achieved through irradiation with light once, thereby improving processability of the polarizing plate. In an embodiment, the first bonding layer 120 may have a thickness of about 0.1 μm to about 10 μm, and, in an embodiment, about 0.5 μm to about 5 μm. Within this range, the bonding layer can be used in the polarizing plate.

Second Retardation Layer

In an embodiment, the second retardation layer 130 may have an in-plane retardation of about 80 nm to about 100 nm at a wavelength of about 550 nm. With this structure, the second retardation layer 130 can achieve remarkable reduction in reflectivity at both the front side and the lateral side while securing an ellipticity of about 65% or more at an incidence angle of about 60° through combination with the first retardation layer 120. In an embodiment, the second retardation layer 130 has an in-plane retardation of about 90 nm to about 95 nm at a wavelength of about 550 nm. In an embodiment, the second retardation layer 130 may be a ⅙ retardation layer at a wavelength of about 550 nm.

In an embodiment, the second retardation layer 130 exhibits positive dispersion and may have a short wavelength dispersion of about 1 to about 1.1 and a long wavelength dispersion of about 0.96 to about 1. In an embodiment, the second retardation layer 130 has a short wavelength dispersion of about 1 to about 1.06 and a long wavelength dispersion of about 0.97 to about 1.

In an embodiment, the second retardation layer 130 may have an out-of-plane retardation (Rth) of about −100 nm to about −50 nm (for example, −100 nm, −90 nm, −80 nm, −70 nm, −60 nm, or −50 nm), and, in an embodiment, greater than about −100 nm to −50 nm, about −70 nm to about −50 nm, or about −70 nm to about −60 nm, at a wavelength of about 550 nm. Within this range, the second retardation layer 130 can reduce lateral reflectivity through improvement in ellipticity with respect to the lateral side.

In an embodiment, the second retardation layer 130 may have a degree of biaxiality of about −0.5 to about −0.2 (for example, −0.5, −0.4, −0.3, or −0.2), and, in an embodiment, about −0.4 to about −0.2, and, in an embodiment, about −0.3 to about −0.2, at a wavelength of about 550 nm. Within this range, the second retardation layer 130 can reduce lateral reflectivity through improvement in ellipticity with respect to the lateral side.

In an embodiment, the second retardation layer 130 may have an index of refraction of about 1.4 to about 1.6, and, in an embodiment, about 1.5 to about 1.6. Within this range, the second retardation layer 130 allows control of the index of refraction with respect to the first retardation layer 120, thereby improving transparency.

The second retardation layer 130 is formed of a composition for the second retardation layer 130 described below. Here, the second retardation layer 130 may be formed such that the slow axis of the second retardation layer 130 can be tilted at an angle within a certain range (e.g., a predetermined range) with respect to the transmission axis of the polarizer 110 by controlling a coating direction and/or a coating method, whereby the polarizing plate can reduce front and lateral reflectivity while improving ellipticity at the lateral side.

For the polarizing plate according to the present invention, the first retardation layer 120 and the second retardation layer 130 may satisfy at least one of the following ① to ⑧ in Relation 1:

① when 0°<θ[fast axis of first retardation layer–absorption axis]<90°, θ[fast axis of second retardation layer–absorption axis]=θ[fast axis of first retardation layer–absorption axis]×2+45+α, 4°≤α≤6°;

② when −90°<θ[slow axis of first retardation layer–absorption axis]<0°, θ[slow axis of second retardation layer–absorption axis]=θ[slow axis of first retardation layer–absorption axis]×2+45+α, 4°≤α≤6°;

③ when −90°<θ[fast axis of first retardation layer–absorption axis]<0°, θ[fast axis of second retardation layer–absorption axis]=θ[fast axis of first retardation layer–absorption axis]×2−45−α, 4°≤α≤6°; and ④ when 0°<θ[slow axis of first retardation layer–absorption axis]<90°, θ[slow axis of second retardation layer–absorption axis]=θ[slow axis of first retardation layer–absorption axis]×2−45−α, 4°≤α≤6°, (in ①, ②, ③, and ④, θ[fast axis of first retardation layer–absorption axis] is an angle (unit: °) of the fast axis of the first retardation layer with reference to the absorption axis of the polarizer, θ[slow axis of first retardation layer–absorption axis] is an angle (unit: °) of the slow axis of the first retardation layer with reference to the absorption axis of the polarizer, θ[fast axis of second retardation layer–absorption axis] is an angle (unit: °) of the fast axis of the second retardation layer with reference to the absorption axis of the polarizer, and θ[slow axis of second retardation layer–absorption axis] is an angle (unit: °) of the slow axis of the second retardation layer with reference to the absorption axis of the polarizer);

⑤ when 0°<θ[slow axis of first retardation layer–transmission axis]<90°, θ[slow axis of second retardation layer–transmission axis]=θ[slow axis of first retardation layer–transmission axis]×2+45+α, 4°≤α≤6°;

⑥ when −90°<θ[fast axis of first retardation layer–transmission axis]<0°, θ[fast axis of second retardation layer–transmission axis]=θ[fast axis of first retardation layer–transmission axis]×2−45+α, 4°≤α≤6°;

⑦ when −90°<θ[slow axis of first retardation layer–transmission axis]<0°, θ[slow axis of second retardation layer–transmission axis]=θ[slow axis of first retardation layer–transmission axis]×2−45−α, 4°≤α≤6°; and ⑧ when 0°<θ[fast axis of first retardation layer–transmission axis]<90°, θ[fast axis of second retardation layer–transmission axis]=θ[fast axis of first retardation layer–transmission axis]×2−45−α, 4°≤α≤6°, (in ⑤, ⑥, ⑦, and ⑧, θ[fast axis of first retardation layer–transmission axis] is an angle (unit: °) of the fast axis of the first retardation layer with reference to the transmission axis of the polarizer, θ[slow axis of first retardation layer–transmission axis] is an angle (unit: °) of the slow axis of the first retardation layer with reference to the transmission axis of the polarizer, θ[fast axis of second retardation layer–transmission axis] is an angle (unit: °) of the fast axis of the second retardation layer with reference to the transmission axis of the polarizer, and θ[slow axis of second retardation layer–transmission axis] is an angle (unit: °) of the slow axis of the second retardation layer with reference to the transmission axis of the polarizer).

In Relation 1, when a calculated value is 180° or more in calculation of the angles defined in ① to ⑧, a final value is obtained by subtracting 180° from the calculated value. For example, in ⑤, when θ[slow axis of first retardation layer–transmission axis] is 68°, the calculated value is 187° at an angle α of 6° and θ[slow axis of second retardation layer–transmission axis] is calculated as 7°. That is, θ[slow axis of second retardation layer–transmission axis] may be calculated as θ[slow axis of first retardation layer–transmission axis]×2+45+α−180°.

By satisfying Relation 1, the polarizing plate can reduce front and lateral reflectivity while securing an ellipticity of about 65% or more at a lateral side, particularly at an incidence angle of about 60°, thereby remarkably improving screen quality upon application to an optical display apparatus.

In an embodiment, referring to FIG. 2, the slow axis 130a of the second retardation layer 130 is tilted at an angle α2 of about 0° to about +10° or at an angle of about −10° to about 0° with respect to the transmission axis 110a of the polarizer 110. Within this range, the polarizing plate can reduce front and lateral reflectivity. In an embodiment, the angle α2 may be in a range from about +6° to about +8° or from about −8° to about −6°.

In an embodiment, an angle defined between the slow axis 120a of the first retardation layer 120 and the slow axis 130a of the second retardation layer 130 may be in a range of about 55° to about 80° (for example, 55°, 60°, 65°, 70°, 75°, or 80°), and, in an embodiment, about 60° to about 75°, and, in an embodiment, about 60° to about 65°. Within this range, the polarizing plate can reduce reflectivity on a tilted surface.

In an embodiment, the second retardation layer 130 may have a thickness of 20 μm or less, and, in an embodiment, about 1 μm to 20 μm, and, in an embodiment, about 2 μm to 10 μm, and, in an embodiment, about 2 μm to about 8 μm. Within this range, the second retardation layer can efficiently exhibit good out-of-plane retardation (Rth) over the entire width thereof and enables reduction in thickness of the polarizing plate.

Herein, a composition for the second retardation layer 130 will be described.

The second retardation layer 130 may be a non-liquid crystal layer. For the second retardation layer including liquid crystals, an alignment film for alignment of liquid crystals at a certain angle is necessarily provided to the polarizing plate, thereby causing generation of foreign matter. Accordingly, the polarizing plate according to the present invention may not include an alignment layer.

In an embodiment, the composition for the second retardation layer 130 is a non-liquid crystal composition and may include a coating layer including a cellulose ester polymer and/or an aromatic compound, and, in an embodiment, a stretched coating layer. The cellulose ester polymer and/or the aromatic compound may realize negative (−) birefringence.

Next, the cellulose ester polymer will be described.

Herein, "polymer" means an oligomer, a polymer, or a resin.

The cellulose ester polymer may include an ester polymer having an acyl unit, in which at least some hydroxyl groups [a $C_2$ hydroxyl group, a $C_3$ hydroxyl group or a $C_6$ hydroxyl group] of a sugar monomer constituting cellulose are unsubstituted or substituted, as represented by the following Formula 1:

where n is an integer of 1 or more.

A substituent group for the cellulose ester polymer or the acyl unit may include at least one selected from among a halogen atom, a nitro group, an alkyl group (for example, a $C_1$ to $C_{20}$ alkyl group), an alkenyl group (for example, a $C_2$ to $C_{20}$ alkenyl group), a cycloalkyl group (for example, a $C_3$ to $C_{10}$ cycloalkyl group), an aryl group (for example, a $C_6$ to $C_{20}$ aryl group), a hetero aryl group (for example, a $C_3$ to $C_{10}$ aryl group), an alkoxy group (for example, a $C_1$ to $C_{20}$ alkoxy group), an acyl group, and a halogen-containing functional group. The substituent groups may be the same as or different from each other.

Herein, the term "acyl" may mean R—C(=O)—*(* being a linking site, R being a $C_1$ to $C_{20}$ alkyl group, a $C_3$ to $C_{20}$ cycloalkyl group, a $C_6$ to $C_{20}$ aryl group, or a $C_7$ to $C_{20}$ arylalkyl group), as well-known in the art. The "acyl" is coupled to a ring of the cellulose through ester bonding (through an oxygen atom) in the cellulose.

Here, "alkyl," "alkenyl," "cycloalkyl," "aryl," "heteroaryl," "alkoxy," and "acyl" refer to non-halogen based compounds for convenience. The composition for the second retardation layer 130 may include the cellulose ester polymer alone or a mixture including the cellulose ester polymer.

Here, "halogen" means fluorine (F), Cl, Br, or I, and, in an embodiment, F.

The "halogen-containing functional group" is an organic functional group containing at least one halogen atom and may include an aromatic, aliphatic, or alicyclic functional group. For example, the halogen-containing functional group may mean a halogen-substituted $C_1$ to $C_{20}$ alkyl group, a halogen-substituted $C_2$ to $C_{20}$ alkenyl group, a halogen-substituted $C_2$ to $C_{20}$ alkynyl group, a halogen-substituted $C_3$ to $C_{10}$ cycloalkyl group, a halogen-substituted $C_1$ to $C_{20}$ alkoxy group, a halogen-substituted acyl group, a halogen-substituted $C_6$ to $C_{20}$ aryl group, or a halogen-substituted $C_7$ to $C_{20}$ arylalkyl group, without being limited thereto.

The "halogen-substituted acyl group" may be R'—C(=O)—*(* being a linking site, R' being a halogen-substituted $C_1$ to $C_{20}$ alkyl group, a halogen-substituted $C_3$ to $C_{20}$ cycloalkyl, a halogen-substituted $C_6$ to $C_{20}$ aryl, or a halogen-substituted $C_7$ to $C_{20}$ arylalkyl). The "halogen-substituted acyl group" may be coupled to a ring of the cellulose through ester bonding (through an oxygen atom) in the cellulose.

In an embodiment, the composition for the second retardation layer includes a cellulose ester polymer substituted with a halogen or a halogen-containing functional group. In an embodiment, the halogen is fluorine. In an embodiment, the halogen may be present in an amount of 1 wt % to 10 wt % in the cellulose ester polymer. Within this range, the composition allows easy formation of the second retardation layer having properties of the present invention.

For formation of the second retardation layer 130, the cellulose ester polymer may be prepared by a typical method known to those skilled in the art or may be obtained from commercially available products. For example, the cellulose ester polymer having an acyl group as a substituent group may be prepared by reacting trifluoroacetic acid or trifluoroacetic anhydride with the sugar monomer constituting the cellulose represented by Formula 1 or a polymer of the sugar monomer, by reacting trifluoroacetic acid or trifluoroacetic anhydride therewith, followed by additionally reacting an acylation agent (for example, carboxylic anhydride or carboxylic acid) therewith, or by reacting both trifluoroacetic acid or trifluoroacetic anhydride and the acylation agent therewith.

The aromatic compound may include a phenyl group and may include a polystyrene compound or a fluorobenzene or difluorostyrene structure, without being limited thereto. In an embodiment, the polystyrene compound may include a moiety represented by the following Formula 2:

where ⁓⁓⁓ is a linking site of an atom, $R^1$, $R^2$ and $R^3$ are each independently a hydrogen atom, an alkyl group, a substituted alkyl group, or a halogen; Rs are each independently a substituent group on a styrene ring; and n is an integer of 0 to 5 indicating the number of substituent groups on the styrene ring.

Examples of the substituent group R on the styrene ring may include an alkyl group, a substituted alkyl group, a halogen atom, a hydroxyl group, a carboxyl group, a nitro group, an alkoxy group, an amino group, a sulfonate group, a phosphate group, an acyl group, an acyloxy group, a phenyl group, an alkoxycarbonyl group, and a cyano group.

In an embodiment, at least one of $R^1$, $R^2$ and $R^3$ may be a halogen, and, in an embodiment, fluorine.

The composition for the second retardation layer 130 may further include an aromatic fused ring-containing additive besides the cellulose ester polymer and the aromatic compound. The aromatic fused ring-containing additive serves to adjust wavelength dispersion. Examples of the aromatic fused ring-containing additive may include 2-naphthylbenzoate, anthracene, phenanthrene, 2,6-naphthalene dicarboxylic diester, and the like. In an embodiment, the aromatic fused ring-containing additive may be present in an amount of 0.1 wt % to 30 wt %, and, in an embodiment, 1 wt % to 10 wt %, in the composition for the second retardation layer 130. Within this range, the aromatic fused ring-containing additive can adjust retardation and wavelength dispersion.

The composition for the second retardation layer 130 may further include typical additives known to those skilled in the art. The additives may include pigments and antioxidants, without being limited thereto.

Although not shown in FIG. 2, an adhesive layer or a bonding layer may be formed on a lower surface of the second retardation layer 130 to allow the polarizing plate to be stacked on a device of an optical display apparatus, for example, a light emitting diode panel.

Laminate of First Retardation Layer and Second Retardation Layer

In an embodiment, a laminate of the first retardation layer 120 and the second retardation layer 130 may have an in-plane retardation of about 140 nm to about 190 nm (for example, 140 nm, 150 nm, 160 nm, 170 nm, 180 nm, or 190 nm), and, in an embodiment, about 150 nm to about 170 nm, at a wavelength of about 550 nm. Within this range, the polarizing plate can reduce reflectivity while improving ellipticity.

In an embodiment, the laminate of the first retardation layer 120 and the second retardation layer 130 may be formed by coating the composition for the second retardation layer 130 on the first retardation layer 120, followed by stretching the coating layer. In an embodiment, the laminate of the first retardation layer 120 and the second retardation layer 130 may be formed by coating the composition for the second retardation layer 130 on a non-stretched or obliquely stretched film for the first retardation layer 120 to form a coating layer for the second retardation layer 130, followed by stretching the coating in the MD direction of the first retardation layer 120.

In another embodiment, the laminate of the first retardation layer 120 and the second retardation layer 130 may be formed by adhesively attaching the first retardation layer 120 to the second retardation layer 130 via an adhesive (for example, a pressure-sensitive adhesive (PSA)).

Polarizer

The polarizer 110 serves to convert natural light or polarized light into polarized light through linear polarization in a certain direction and may be produced from a polymer film essentially containing a polyvinyl alcohol resin. In an embodiment, the polarizer 130 may be produced by dyeing the polymer film with iodine or dichroic dyes, followed by stretching the film in the MD. In an embodiment, the polarizer may be produced through swelling, dyeing, stretching, and crosslinking.

In an embodiment, the polarizer 110 may have a total light transmittance of 40% or more, for example, 40% to 47%, and a degree of polarization of 99% or more, for example, 99% to 100%. Within this range, the polarizer can improve antireflection performance of the polarizing plate through combination with the first retardation layer 120 and the second retardation layer 130.

In an embodiment, the polarizer 110 may have a thickness of about 2 μm to about 30 μm, and, in an embodiment, about 4 µm to about 25 µm. Within this range, the polarizer 110 can be used in the polarizing plate.

Protective Film

The protective film 140 is formed on an upper surface of the polarizer 110 to protect the polarizer 110 from an external environment while improving mechanical strength of the polarizing plate. However, it should be noted that the protective film 140 can be omitted if omission of the protective film 140 does not affect properties and mechanical strength of the polarizing plate.

The protective film 140 serves to protect the polarizer 110 from an external environment and may be an optically transparent film formed of, for example, at least one resin selected from among cellulose resins including triacetylcellulose (TAC) and the like, polyester resins including polyethylene terephthalate, polybutylene terephthalate, polyethylene naphthalate (PEN), polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. In an embodiment, the protective film may be a TAC film or a PET film.

In an embodiment, the protective film 140 may have a thickness of about 5 µm to about 70 µm, and, in an embodiment, about 15 µm to about 45 µm. Within this range, the protective film 140 can be used in the polarizing plate.

Although not shown in FIG. 1, a functional coating layer may be further formed on an upper surface of the protective film 140 to provide an additional function to the polarizing plate. For example, the functional coating layer may include any of a hard coating layer, an anti-fingerprint layer, an antireflection layer, an antiglare layer, and the like. These functional coating layers may be stacked alone or in combination thereof.

Although not shown in FIG. 1, the protective film 140 may be bonded to the polarizer 110 via a second bonding layer. The second bonding layer may be formed of a water-based bonding agent and/or a photo-curable bonding agent. In an embodiment, the second bonding layer is formed of a photo-curable bonding agent, whereby bonding between the protective film 140 and the polarizer 110 and bonding between the polarizer 110 and the first retardation layer 120 can be achieved through irradiation with light once, thereby improving processability of the polarizing plate.

In an embodiment, the photo-curable bonding agent may be formed of a composition for the first bonding layer. In an embodiment, the composition may include a photoinitiator having an absorption function with respect to light having a wavelength of about 300 nm to about 400 nm and serving to initiate reaction upon irradiation with the light. The photoinitiator may include a photo-radical photoinitiator and/or a cationic photoinitiator.

In an embodiment, the second bonding layer may have a thickness of about 0.1 µm to about 10 µm, and, in an embodiment, about 0.5 µm to about 5 µm. Within this range, the second bonding layer can be used in the polarizing plate.

Next, a polarizing plate according to another embodiment of the present invention will be described.

The polarizing plate according to another embodiment includes a polarizer, a protective film stacked on an upper surface of the polarizer, and a first retardation layer and a second retardation layer sequentially stacked on a lower surface of the polarizer, wherein the first retardation layer may have an in-plane retardation of about 180 nm to about 220 nm at a wavelength of about 550 nm; and the second retardation layer may have an in-plane retardation of about 80 nm to about 100 nm at a wavelength of about 550 nm. The polarizing plate may further include a third retardation layer.

In an embodiment, the third retardation layer may be interposed between the polarizer and the first retardation layer.

The third retardation layer may include a positive C retardation layer, which satisfies nz>nx≈ny (nx, ny, and nz being indices of refraction of the third retardation layer at a wavelength of 550 nm in the slow direction, the fast direction, and the thickness direction thereof, respectively).

In an embodiment, the third retardation layer may have an out-of-plane retardation (Rth) of about −300 nm to about 0 nm, for example, about −80 nm to about 0 nm (for example, −80 nm, −70 nm, −60 nm, −50 nm, −40 nm, −30 nm, −20 nm, −10 nm, or 0), about −80 nm to about −20 nm, or about −40 nm to about −30 nm, at a wavelength of about 550 nm. In an embodiment, the third retardation layer may have an in-plane retardation of about 0 nm to about 10 nm, for example, about 0 nm to 5 nm, at a wavelength of about 550 nm. Within this range, the polarizing plate can realize reduction in reflectivity.

In an embodiment, the third retardation layer may be a liquid crystal layer. The liquid crystal layer may be formed of a typical material well-known to realize the above out-of-plane retardation.

In another embodiment, the third retardation layer may be formed of the composition for the second retardation layer described above.

An optical display apparatus according to the present invention may include the polarizing plate according to an embodiment of the present invention. For example, the optical display apparatus may include any of organic light emitting diode (OLED) displays or liquid crystal displays.

In an embodiment, the OLED display apparatus may include: an OLED panel including a flexible substrate; and the polarizing plate according to the present invention stacked on the OLED panel.

In another embodiment, the OLED display apparatus may include: an OLED panel including a non-flexible substrate; and the polarizing plate according to the present invention stacked on the OLED panel.

Next, the present invention will be described in more detail with reference to some examples. However, it should be noted that these examples are provided for illustration and are not to be construed in any way as limiting the present invention.

Example 1

A polyvinyl alcohol film (PS #60, pre-stretching thickness: 60 µm, Kuraray Co., Ltd.) was stretched to 6 times an initial length thereof in an aqueous solution of iodine at 55° C., thereby preparing a polarizer having a transmittance of 45%.

A coating for a second retardation layer was formed by depositing a composition [non-crystalline composition comprising a cellulose ester polymer (comprising trifluoroacetyl) comprising 5 wt % of fluorine therein] for the second retardation layer on a lower surface of a cyclic polyolefin (COP) film (ZD film, Zeon Co., Ltd.). The cellulose ester polymer was prepared by adding trifluoroacetic acid and trifluoroacetic anhydride to unsubstituted cellulose, followed by reaction and polymerization.

After drying the coating, a laminate of the coating and the COP film was obliquely stretched to 1.7 times an initial length thereof at 110° C. and at 45° with reference to the MD of the COP film, thereby preparing a laminate of the first retardation layer (flat dispersion) and the second retardation layer (positive dispersion) having specifications as listed in Table 1.

With an HC-TAC film (25FJCHCN-TC, thickness: 32 μm, Toppan) stacked as a protective film on an upper surface of the polarizer, the laminate of the first retardation layer (thickness: 37 μm) and the second retardation layer (thickness: 3 μm) was attached to a lower surface of the polarizer, thereby providing a polarizing plate.

Examples 2 to 5

Polarizing plates were fabricated in the same manner as in Example 1 except that retardation of each of the first and second retardation layers was changed through change of elongation and stretching temperature, as listed in Table 1.

Examples 6 to 9

Polarizing plates were fabricated in the same manner as in Example 1 except that a positive C plate retardation layer (a third retardation layer formed of a cellulose ester composition) having Rth(@550 nm) as listed in Table 1 was additionally stacked between the polarizer and the first retardation layer and features of each of the first retardation layer and the second retardation layer were maintained or changed as listed in Table 1.

Comparative Examples 1 to 4

Polarizing plates were fabricated in the same manner as in Example 1 except that retardation of each of the first and second retardation layers was changed through change of elongation and stretching temperature, as listed in Table 1.

Retardations Re, Rth, and NZ of each of the first and second retardation layers were measured at a wavelength of 550 nm using an AxoScan polarimeter (AxoMetric Co., Ltd.).

Each of the polarizing plates fabricated in the Examples and Comparative Examples was evaluated as to the following properties. Results are shown in Table 1.

(1) Reflectivity (unit: %): Reflectivity was measured using an extended Jones matrix calculation method through parameterization of each layer in the polarizing plate under the assumption of complete reflection. Here, the outermost primary reflection was excluded in calculation.

(2) Ellipticity (unit: %): Ellipticity was measured at each azimuth angle of 1° through parameterization of each layer in the polarizing plate by allowing natural light to sequentially pass through the polarizer, the first retardation layer and the second retardation layer of the polarizing plate at an incident angle (60°). Minimum values of the ellipticity are shown in Table 1

TABLE 1

|  |  | Example |  |  |  |  |  |  |  |  | Comparative Example |  |  |  |
|---|---|---|---|---|---|---|---|---|---|---|---|---|---|---|
|  |  | 1 | 2 | 3 | 4 | 5 | 6 | 7 | 8 | 9 | 1 | 2 | 3 | 4 |
| First retardation layer | Re | 200 | 180 | 180 | 210 | 220 | 200 | 200 | 200 | 200 | 175 | 225 | 200 | 200 |
|  | Rth | 120 | 108 | 132 | 120 | 120 | 120 | 120 | 120 | 120 | 105 | 135 | 120 | 120 |
|  | NZ | 1.1 | 1.1 | 1.1 | 1.1 | 1.1 | 1.1 | 1.1 | 1.1 | 1.1 | 1.1 | 1.1 | 1.1 | 1.1 |
|  | Short wavelength dispersion | 1 | 1 | 1 | 1 | 1 | 1 | 1 | 1 | 1 | 1 | 1 | 1 | 1 |
|  | Long wavelength dispersion | 1 | 1 | 1 | 1 | 1 | 1 | 1 | 1 | 1 | 1 | 1 | 1 | 1 |
| Second retardation layer | Re | 90 | 85 | 80 | 95 | 100 | 90 | 90 | 90 | 90 | 90 | 90 | 65 | 125 |
|  | Rth | −63 | −63 | −63 | −70 | −56 | −63 | −63 | −63 | −63 | −63 | −63 | −45.5 | −87.5 |
|  | NZ | −0.2 | −0.2 | −0.2 | −0.2 | −0.2 | −0.2 | −0.2 | −0.2 | −0.2 | −0.2 | −0.2 | −0.2 | −0.2 |
|  | Short wavelength dispersion | 1.05 | 1.05 | 1.05 | 1.05 | 1.05 | 1.05 | 1.05 | 1.05 | 1.05 | 1.05 | 1.05 | 1.05 | 1.05 |
|  | Long wavelength dispersion | 0.97 | 0.97 | 0.97 | 0.97 | 0.97 | 0.97 | 0.97 | 0.97 | 0.97 | 0.97 | 0.97 | 0.97 | 0.97 |
| Third retardation layer Rth |  | — | — | — | — | — | −90 | −80 | −20 | −10 | — | — | — | — |
| Angle 1(°) |  | +68 | +68 | +68 | +68 | +68 | +68 | +68 | +68 | +68 | +68 | +68 | +68 | +68 |
| Angle 2(°) |  | +7 | +7 | +7 | +7 | +7 | +7 | +7 | +7 | +7 | +7 | +7 | +7 | +7 |
| Reflectivity | At front | 0.3 | 1.4 | 0.9 | 0.8 | 0.6 | 0.3 | 0.3 | 0.3 | 0.3 | 1.9 | 1.3 | 3.0 | 6.4 |
|  | At 60° | 2.2 | 2.5 | 2.3 | 2.4 | 2.8 | 1.3 | 1.1 | 1.6 | 1.9 | 3.2 | 3.6 | 4.7 | 7.6 |
| Minimum ellipticity at an incidence angle of 60° |  | 72.6 | 67.6 | 71.1 | 70.7 | 67.8 | 73.5 | 75.1 | 76.6 | 74.7 | 62.0 | 57.3 | 53.0 | 43.8 |

*Angle 1: Angle between slow axis of first retardation layer and transmission axis of polarizer
*Angle 2: Angle between slow axis of second retardation layer and transmission axis of polarizer As shown in Table 1, the polarizing plate according to the present invention had low reflectivity at both the front side and the lateral side, and had an ellipticity of about 65% or more at an incidence angle of 60°, thereby improving screen quality (minimizing color variation at an incidence angle of 60° and at an azimuth angle of 0° to 360°). In addition, the polarizing plates of Examples 6 to 9 each including the positive C plate had better effects than the polarizing plates of Examples 1 to 5 each including no positive C plate.

On the contrary, the polarizing plates of Comparative Examples 1 to 4 including the first retardation layer and the second retardation layer each having in-plane retardation out of the in-plane retardation according to the present invention had higher reflectivity at both the front side and the lateral side than the polarizing plates of the Examples and could not achieve an ellipticity of about 65% or more at an incidence angle of 60°.

While some embodiments of the present invention have been described herein, it is to be understood that various modifications, changes, alterations, and equivalent embodiments can be made by those skilled in the art without departing from the spirit and scope of the present invention.

What is claimed is:

1. A polarizing plate comprising: a polarizer; and a first retardation layer and a second retardation layer sequentially stacked on a lower surface of the polarizer,
   wherein the first retardation layer has an in-plane retardation of about 180 nm to about 220 nm at a wavelength of about 550 nm,
   the second retardation layer has an in-plane retardation of about 80 nm to about 100 nm at a wavelength of about 550 nm and a degree of biaxiality (NZ) of about −0.5 to −0.2 at a wavelength of about 550 nm,
   the first retardation layer exhibits positive wavelength dispersion or flat wavelength dispersion,
   the first retardation layer has a slow axis tilted at an angle of about +55° to about +80° or at an angle of about −80° to about −55° with reference to a transmission axis of the polarizer, and
   the polarizing plate has an ellipticity of about 65% or more at an incidence angle of about 60°.

2. The polarizing plate according to claim 1, wherein the first retardation layer is a ⅓ retardation layer at a wavelength of about 550 nm and the second retardation layer is a ⅙ retardation layer at a wavelength of about 550 nm.

3. The polarizing plate according to claim 1, wherein the second retardation layer has a slow axis tilted at an angle of about 0° to about +10° or at an angle of about −10° to about 0° with reference to a transmission axis of the polarizer.

4. The polarizing plate according to claim 1, wherein the first retardation layer and the second retardation layer satisfy at least one of ① to ⑧ in Relation 1:
   ① when 0°<θ[fast axis of first retardation layer–absorption axis]<90°, θ[fast axis of second retardation layer–absorption axis]=θ[fast axis of first retardation layer–absorption axis]×2+45+α, 4°≤α≤6°;
   ② when −90°<θ[slow axis of first retardation layer–absorption axis]<0°, θ[slow axis of second retardation layer–absorption axis]=θ[slow axis of first retardation layer–absorption axis]×2−45+α, 4°≤α≤6°;
   ③ when −90°<θ[fast axis of first retardation layer–absorption axis]<0°, θ[fast axis of second retardation layer–absorption axis]=θ[fast axis of first retardation layer–absorption axis]×2−45−α, 4°≤α≤6°; and
   ④ when 0°<θ[slow axis of first retardation layer–absorption axis]<90°, θ[slow axis of second retardation layer–absorption axis]=θ[slow axis of first retardation layer–absorption axis]×2−45−α, 4°≤α≤6°,
   in (1), (2), (3), and (4), θ[fast axis of first retardation layer–absorption axis] is an angle (unit: °) of the fast axis of the first retardation layer with reference to the absorption axis of the polarizer, θ[slow axis of first retardation layer–absorption axis] is an angle of the slow axis of the first retardation layer with reference to the absorption axis of the polarizer, θ[fast axis of second retardation layer–absorption axis] is an angle of the fast axis of the second retardation layer with reference to the absorption axis of the polarizer, and θ[slow axis of second retardation layer–absorption axis] is an angle of the slow axis of the second retardation layer with reference to the absorption axis of the polarizer;
   ⑤ when 0°<θ[slow axis of first retardation layer–transmission axis]<90°, θ[slow axis of second retardation layer–transmission axis]=θ[slow axis of first retardation layer–transmission axis]×2+45+α, 4°≤α≤6°;
   ⑥ when −90°<θ[fast axis of first retardation layer–transmission axis]<0°, θ[fast axis of second retardation layer–transmission axis]=θ[fast axis of first retardation layer–transmission axis]×2−45+α, 4°≤α≤6°;
   ⑦ when −90°<θ[slow axis of first retardation layer–transmission axis]<0°, θ[slow axis of second retardation layer–transmission axis]=θ[slow axis of first retardation layer–transmission axis]×2−45− α, 4°≤α≤6°;
   ⑧ when 0°<θ[fast axis of first retardation layer–transmission axis]<90°, θ[fast axis of second retardation layer–transmission axis]=θ[fast axis of first retardation layer–transmission axis]×2−45−α, 4°≤α≤6°,
   in (5), (6), (7) and (8), θ[fast axis of first retardation layer–transmission axis] is an angle of the fast axis of the first retardation layer with reference to the transmission axis of the polarizer, θ[slow axis of first retardation layer–transmission axis] is an angle of the slow axis of the first retardation layer with reference to the transmission axis of the polarizer, θ[fast axis of second retardation layer–transmission axis] is an angle of the fast axis of the second retardation layer with reference to the transmission axis of the polarizer, and θ[slow axis of second retardation layer–transmission axis] is an angle of the slow axis of the second retardation layer with reference to the transmission axis of the polarizer).

5. The polarizing plate according to claim 1, wherein an angle defined between a slow axis of the first retardation layer and a slow axis of the second retardation layer is in a range from about 55° to about 80°.

6. The polarizing plate according to claim 1, wherein the second retardation layer exhibits positive wavelength dispersion.

7. The polarizing plate according to claim 1, wherein a laminate of the first retardation layer and the second retardation layer has an in-plane retardation of about 140 nm to about 190 nm at a wavelength of about 550 nm.

8. The polarizing plate according to claim 1, wherein the first retardation layer has an out-of-plane retardation (Rth) of about 100 nm to about 150 nm at a wavelength of about 550 nm.

9. The polarizing plate according to claim 1, wherein the first retardation layer has a degree of biaxiality (NZ) of about 1.1 to about 1.2 at a wavelength of about 550 nm.

10. The polarizing plate according to claim 1, wherein the second retardation layer has an out-of-plane retardation (Rth) of about −100 nm to about −50 nm at a wavelength of about 550 nm.

11. The polarizing plate according to claim 1, wherein the first retardation layer comprises a film formed of a resin having positive birefringence.

12. The polarizing plate according to claim 1, wherein the second retardation layer comprises a coating layer formed by stretching a film formed of at least one selected from among a cellulose ester resin and an aromatic resin.

13. The polarizing plate according to claim 1, further comprising a third retardation layer including a positive C plate having an out-of-plane retardation (Rth) of about −300 nm to about 0 nm at a wavelength of about 550 nm.

14. The polarizing plate according to claim 13, wherein the third retardation layer has an out-of-plane retardation (Rth) of about −80 nm to about −20 nm at a wavelength of about 550 nm.

15. The polarizing plate according to claim 13, wherein the third retardation layer is interposed between the polarizer and the first retardation layer.

16. The polarizing plate according to claim 1, further comprising a protective layer on an upper surface of the polarizer.

17. An optical display apparatus comprising the polarizing plate according to claim 1.

* * * * *